Nov. 18, 1930.  C. MATSCHEI  1,782,361
FRONT WHEEL DRIVING JOINT WITH STEERING SWIVEL FOR MOTOR VEHICLES
Filed Aug. 20, 1927  2 Sheets-Sheet 1
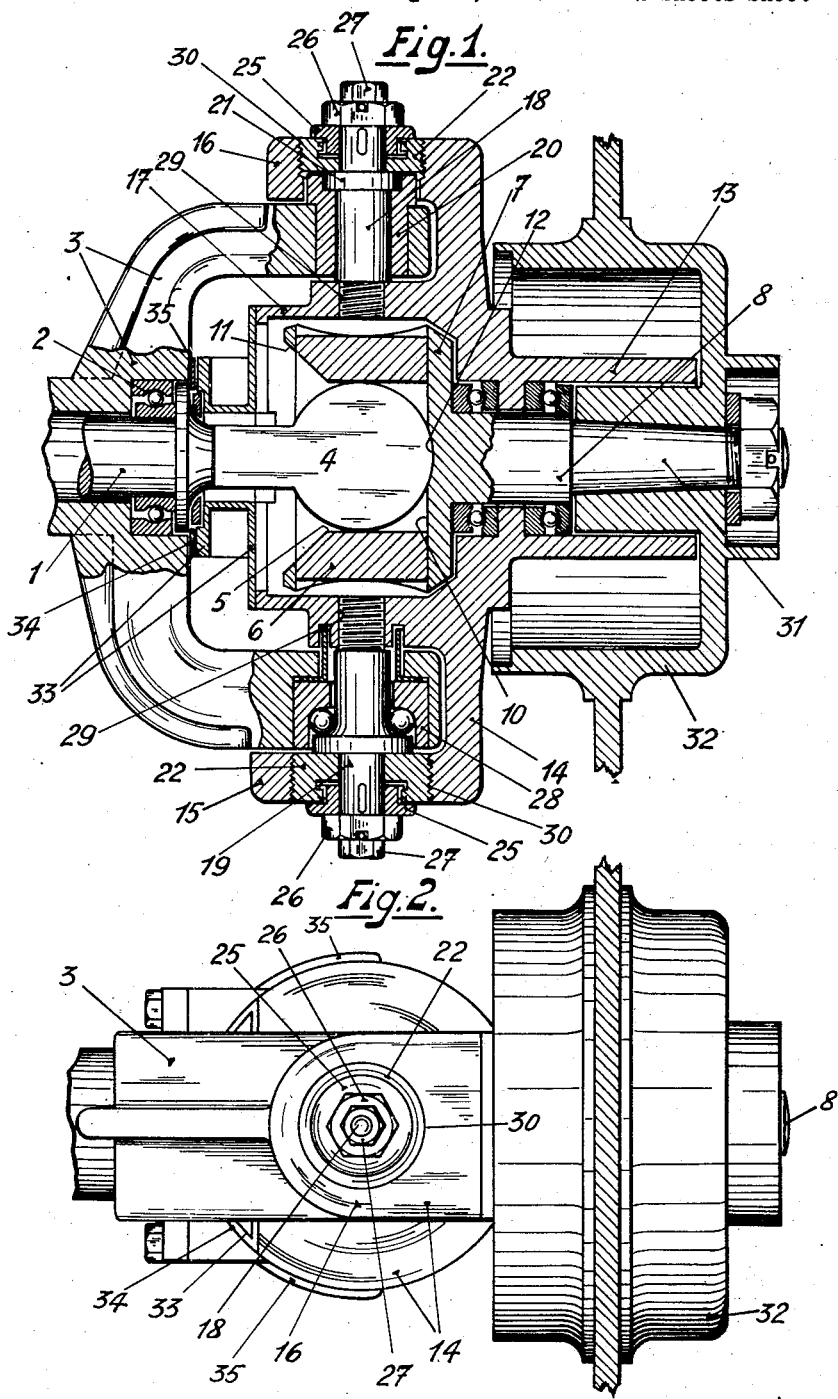

Nov. 18, 1930.  C. MATSCHEI  1,782,361
FRONT WHEEL DRIVING JOINT WITH STEERING SWIVEL FOR MOTOR VEHICLES
Filed Aug. 20, 1927  2 Sheets-Sheet 2
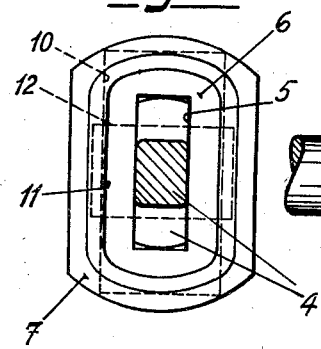
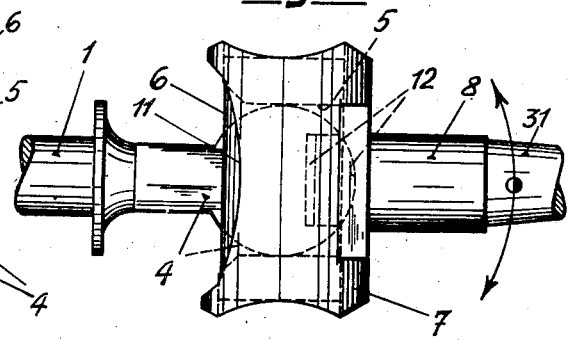
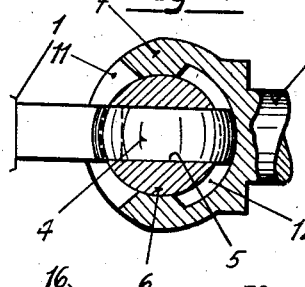
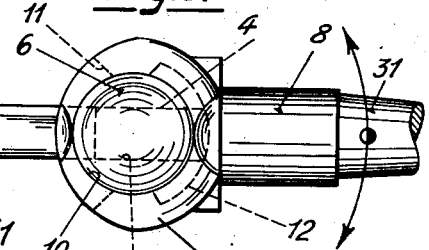
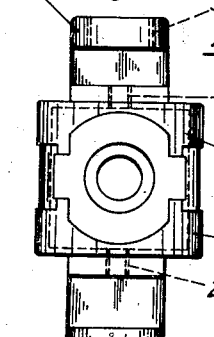
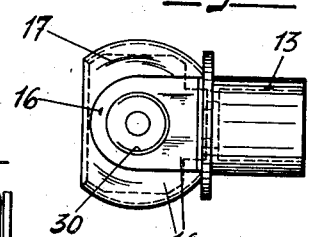
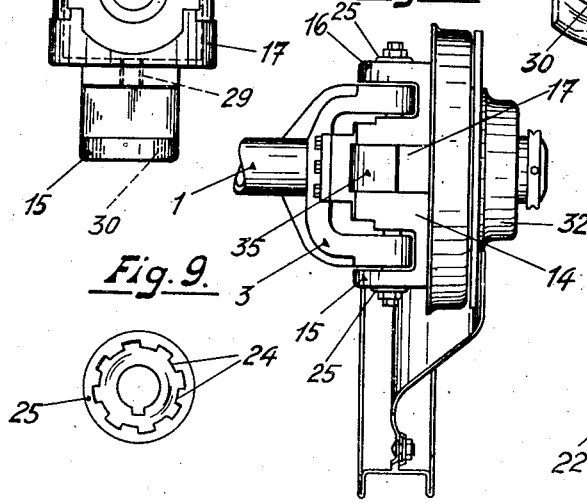
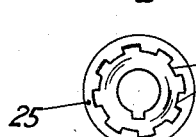
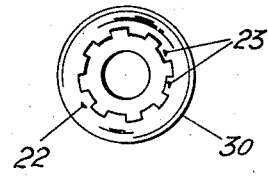

Patented Nov. 18, 1930

1,782,361

UNITED STATES PATENT OFFICE

CURT MATSCHEI, OF WETTINGEN, SWITZERLAND

FRONT-WHEEL-DRIVING JOINT WITH STEERING SWIVEL FOR MOTOR VEHICLES

Application filed August 20, 1927, Serial No. 214,338, and in Switzerland January 13, 1927.

This invention relates to stub axle mounts and their application to combined steering and driving wheels, and the object of the invention is to provide an improved and compact stub axle mount for use with road wheels having combined steering and driving means.

According to the invention the stub axle mount comprises a driving member formed at the end of a driving shaft and consisting of a flat partly spherical member in fitting engagement with a slot in a cylindrical driven member, the free end of the driving element projecting into an arcuate groove formed in the head of the front wheel axle concentrically to the cylindrical driven element.

An embodiment of the invention is illustrated, by way of example, in the accompanying drawing, in which:—

Fig. 1 shows the front wheel stub axle mount with steering swivel in axial section.

Fig. 2 is a top plan view.

Fig. 3 shows in front elevation only the mount.

Fig. 4 is an end elevation of the mount, viewed from the driving shaft.

Fig. 5 shows the mount in top plan view.

Fig. 6 is a horizontal section through the mount.

Fig. 7 shows the steering swivel in end elevation and

Fig. 8 in top plan view.

Figs. 9 and 10 show constructional details.

Fig. 11 shows in elevation the complete stub axle joint with steering swivel.

The stub axle joint with steering swivel comprises a driving shaft 1, which, by means of a ball bearing 2, is rotatably supported in a fork 3. The end of driving shaft 1 is formed by a flat partly spherical head 4, serving as driving member and which freely projects from the fork 3 as shown in Figs. 1 and 3 to 6.

This member 4 engages with a slot 5 of a cylindrical joint-element 6. This slot 5 extends in the longitudinal direction of the joint-element 6 and from one end to the other of the same. The cylindrical joint-element 6 is rotatably mounted in a head 7 of a front wheel axle 8.

Transversely to the axle 8, joining the head 7 a continuous bore 10 is arranged to facilitate the mounting of the joint-element, which is loosely located in said bore. The bore 10 is open towards the driving shaft 1 to facilitate the insertion of the member 4 into the joint-element and consequently into the head 7. The open end 11 of bore 10 is clearly visible in the joint-element 6. The member 4 is accurately guided in the joint-element 6 and projects into an arc-shaped groove 12 of the head 7. This groove faces the open end 11 of bore 10 and extends concentrically to said bore.

Owing to the peculiar mounting described of the catch 14 in the elements 6 and 7, a ball-joint like and positive joint-connection of the front-wheel-axle 8 and the driving shaft 1 is obtained, which means that at any rotative position of the member 4 the front-wheel-axle 8 can oscillate for instance when running through a curve, the revolving power-transmission upon the axle 8 remaining permanently the same. The ends of the arc-shaped groove and the long sides of the orifice 11 determine the amplitude of the angle of oscillation of axle 8. This axle 8 is rotatably mounted, by means of two ball-bearings, in a hub 13 of the steering swivel 14. The steering swivel is fork-shaped and comprises two arms 15, 16 and a hollow cylindrical casing 17 located between these arms. This steering swivel 14 is hingedly mounted on the fork 3 by means of bolts 18 and 19 locked in their position. The bolts 18, 19 are situated accurately in the pivot-axis of the joint-element 6 and in the pivot-point of member 4. The bolt 18, i. e. the upper bolt, engages with a sleeve 20 of fork 3 and has a collar 21 which rests upon said sleeve 20. Each bolt 18, 19 is screwed at one end in the cylindrical casing 17 and its other end rests in a safety-nut 22. These nuts 22 are screwed into the arms 15, 16 of the steering swivel 14 and rest upon the collars 21 of the bolts. Each nut 22 has inwardly directed grooves and teeth 23, as shown in Figs. 1 and 10, arranged in a circle. Between these teeth 23 engage teeth 24 of locking rings 25 mounted on the bolts and locked on the same by means of nuts 26, 27.

The lower bolt 19 does not rest in a sleeve as the upper bolt but in a ball-bearing 28 of fork 3.

The female threads 29 into which the bolts 18 and 19 are screwed are oppositely directed to the threads of the locking nuts. The same is the case for the external threads 30 of the locking nuts 22 or of the arms 15, 16.

In this manner the bolts 18, 19 are securely locked in the steering swivel 14 so that the font-wheel drive is absolutely secured.

A conical portion 31 of axle 8 and having a threaded portion serves to carry the wheel-hub 32. In order to ensure a dust-proof-closing of the cylindrical hollow space, in which the driving joint is arranged, a segment 33 is fixed on the same, the segment-face 34 of which is pressed on an arc-shaped piece 35 fixed in the fork 3 in any suitable manner. These centres of the segment-face 34 and of the arc-shaped piece 35 are situated in the pivot point of the steering swivel 14.

The revolving movements of driving shaft 1 are transmitted by the flat-spherical member 4 upon the front-wheel axle 8 in whichever angular position this axle may stand to the driving shaft. As the width of slot 5 of the joint-element 6 corresponds accurately to the thickness of member 4, the joint-element 6 must follow all the turning movements of the member or of the driving shaft 1. The head 7 and thus the front-wheel-axle 8 are rotated accordingly, said axle being mounted in the steering swivel oscillatably around the bolts 18, 19.

When the member 4 is in the position shown in Fig. 1 the axle 8 or the head 7 of the same is oscillated around the joint-element 6 when the steering swivel oscillates while, in the position shown in Figs. 5 and 6, the axle 8 will oscillate around the member 4, the pivot-axis and the centre of gravity being always situated in the axis of oscillation of the steering swivel 14; the pivot-point and the sliding surfaces coincide consequently. Herefrom results: a small rotating movement of the sliding surfaces with great acting surfaces and minimum losses from friction so that the power-consumption is reduced to the minimum.

Owing to the fact that the steering swivel is constructed like a double fork and has right-handed and left-handed threads for the secure locking of the steering swivel-bolts, a perfect and absolutely secure front-wheel-drive in motor-vehicles of any kind is obtained.

I claim:—

1. In a motor vehicle a stub axle mount comprising in combination a steering swivel having a hub portion and a fork-shaped portion, threaded bores in the arms of the fork, hollow locking nuts positioned in said bores, pivot bolts arranged one in each of said nuts, teeth arranged in the inner portions of said nuts, a locking disk on each bolt having teeth in its outer circumference designed to engage with the teeth in its outer circumference designed to engage with the teeth of said nuts, a cylindrical casing on said swivel extending between said arms and provided with threaded openings in alinement with said threaded bores, said openings adapted to receive the free ends of said bolts.

2. A stub axle mount as specified in claim 1, comprising in combination with the vehicle frame and the cylindrical casing, a segment-shaped inner end on said casing, a stationary fork on said vehicle frame pivotally associated with said pivot bolts, and an arc shaped piece fixed on said stationary fork and bearing on the face of said segment.

In testimony whereof I affix my signature.
CURT MATSCHEI.